March 20, 1951 F. A. HESTER 2,545,463

BLACK AND WHITE LIMITER

Filed Jan. 2, 1948 2 Sheets-Sheet 1

INVENTOR.
FRANK A. HESTER
BY Alfred W. Barber
ATTORNEY

March 20, 1951 F. A. HESTER 2,545,463

BLACK AND WHITE LIMITER

Filed Jan. 2, 1948 2 Sheets-Sheet 2

*INVENTOR.*
FRANK A. HESTER

*BY* Alfred W. Barber

*ATTORNEY*

Patented Mar. 20, 1951 2,545,463

UNITED STATES PATENT OFFICE 2,545,463

BLACK AND WHITE LIMITER

Frank A. Hester, New York, N. Y., assignor to Faximile, Inc., New York, N. Y., a corporation of Delaware Application January 2, 1948, Serial No. 333

2 Claims. (Cl. 178—5)

The present invention concerns facsimile transmission and reception, and, in particular, the transmission and reception of black and white copy.

In the art of facsimile transmission and reception, graphic material such as printed matter or pictures are scanned in a predetermined sequence by a very small spot of light and the reflected or transmitted light, varying according to the density of the copy, is transformed into electrical signals. These electrical signals are conveyed to a remote point by radio or wire and after proper amplification, rectification or other treatment, are reproduced on a recording sheet in the same sequence in which they were picked up, and in terms of corresponding densities, to provide a recorded facsimile copy. It has generally been assumed that one of the requirements of a good facsimile system is that the recorded point on the received copy correspond exactly in density to the corresponding point of the original copy. In order to more nearly carry this out in an exact manner, various devices have been utilized to correct the electrical characteristics and other elements in the system that would otherwise tend to distort the density scale.

If, however, black and white copy only is to be transmitted it may be desirable to reverse the procedure and purposely distort the relation between the subject copy density and the recorded copy density. Printed copy, outline drawings, and other purely black and white copy having no halftone features may be transmitted more effectively in such a system than in a system in which the density values are held to be proportional. If some predetermined density value is chosen as the dividing line, and all subject copy densities below this line are transmitted as white and all subject copy densities above this line are transmitted as black, a very efficient and effective black and white copy transmission system may be provided. Undesirable background effects may be eliminated, variation in black values may be leveled, gray outlines of black areas, due to aperture distortion, may be eliminated and critical adjustments of level at the facsimile receiver and recorder will not be required with such a system.

According to the present invention facsimile copy is scanned in a conventional manner and the resulting electrical signals are utilized to modulate a subcarrier tone resulting in an amplitude modulated subcarrier signal representing the density variation of the original copy. Since this system is to be used to transmit black and white copy only, most of the modulated signal amplitude will lie around the values, on one side, representing white and, on the other side, representing black. These signals are then sent through a device which has a threshold effect approximately midway between the black and white values which causes all of the values on one side to produce full output and on the other side to produce zero output. In this way intermediate values are eliminated and a signal is transmitted having only two values, a black on one side and a white on the other. When these signals are utilized in a conventional facsimile receiver and recorder the above advantages are realized.

One object of the present invention is to transmit facsimile copy consisting of black and white subject matter and to receive and record the same without intermediate tone values.

Another object is to transmit black and white copy and to record the same with maximum contrast.

Still another object is to eliminate undesirable background effects in black and white facsimile copy.

A further object is to eliminate non-uniform black and white tone values in a facsimile system.

A still further object is to eliminate the gray outlines around black areas caused by aperture distortion in facsimile systems.

Another object is to sharpen the detail and provide maximum contrast in the transmission of black and white copy in a facsimile system.

A further object is to provide a facsimile system requiring less critical operation for the production of sharp contrasting black and white copy.

These and other objects of the present invention will be more fully understood from the detailed description of the invention given in connection with the various figures of the drawings.

Figure 1:
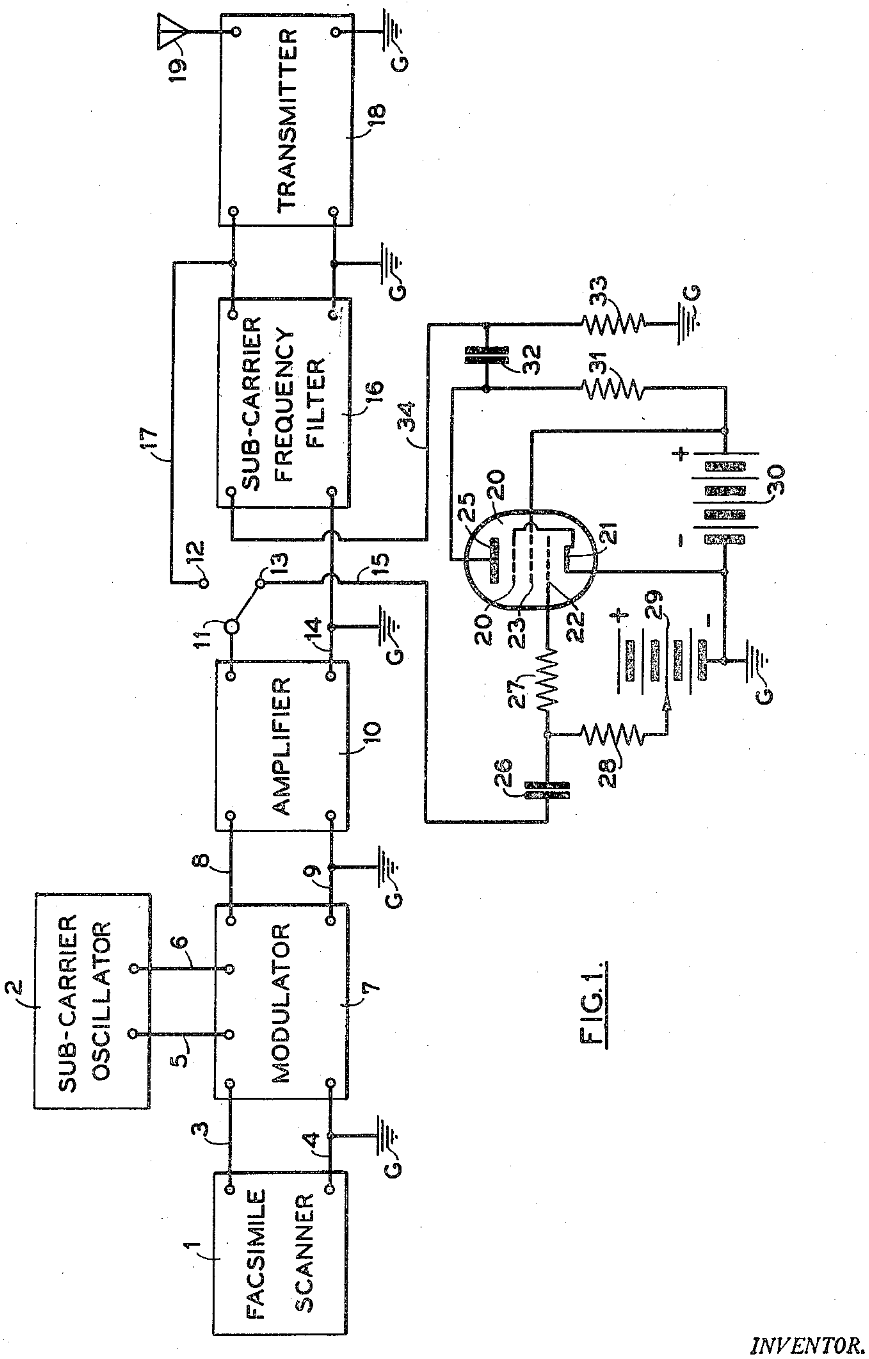
Fig. 1 shows the circuit of a facsimile system transmitter embodying one form of the present invention.

Fig. 1 shows a typical facsimile signal transmitter embodying one form of the present invention in which a facsimile scanner 1, which may be taken to include the pickup scanner, photoelectric cell and amplifiers, feeds signals over leads 3 and 4 through a modulator 7. A subcarrier oscillator 2 also feeds modulator 7 over leads 5 and 6. The facsimile signals generated by the scanner are mixed with the signals from the subcarrier oscillator in modulator 7 and the resulting amplitude modulated wave is fed to amplifier 10 over leads 8 and 9. From amplifier 10 signals may be transmitted in the conventional manner by means of transmitter 18 radiating through antenna 19 by linking points 11 and 12 of switch 11, 12, and 13 and sending the signal over lead 17. In order to operate with maximum and minimum limited tone values, according to the present invention, points 11 and 13 of the switch are connected, applying the amplitude modulated subcarrier signal over lead 15 through capacitor 26 and resistor 27 to grid 22 of a suitable vacuum tube 20. Vacuum tube 20, according to the present invention, is operated along a portion of its characteristic curve such that all signals on its grid 22, which are above a substantially predetermined point, are transmitted with maximum intensity and all those below this point are cut off. One manner in which the tube may operate is, that for all signals exceeding the predetermined limit a pulse of plate voltage is generated corresponding in width to the time during which the grid signal exceeds the predetermined value, while the plate voltage remains at some fixed very low value for all signals on the grid below this point.

One manner of connecting tube 20 is shown in which the tube is a pentode, including cathode 21, heated by conventional means not shown, control grid 22, screen grid 23, suppressor grid 24, and plate 25. Plate 25 receives a suitable positive potential from battery 30 through plate load resistor 31 while screen grid 23 is maintained at a suitable high voltage bias from the same source. Control grid 22 is positively biased at a suitable no signal voltage from battery 29 through resistors 27 and 28. The two potentials are such that, in the absence of incoming signals, plate 25 is saturated creating a large voltage drop through resistor 31 and thereby dropping the voltage of plate 25 to some low value substantially below the voltage of screen grid 23. When signals are applied to grid 22 over lead 15 the grid will be swung up and down due to these signals. If the grid voltage increases there is no tube action since the plate 25 is already drawing saturation current. However, as the grid voltage swings negative, due to the signal placed on it, a point will be reached at which the plate current to plate 25 will suddenly drop to substantially zero and the voltage on plate 25 will rise to a value substantially equal to the voltage of battery 30. Thus, a circuit may be so chosen that, for all grid signal voltages above a predetermined value plate 25 takes saturation current and maintains itself at some low voltage, while, for all signals going negatively beyond the predetermined point plate 25 will take substantially no current and will be maintained at a constant high voltage value. The effect of this operation will be that, for all positive swings of the subcarrier above the predetermined point a square wave having a flat top substantially along the zero line will be generated while the subcarrier values in a negative direction below the predetermined point plate will generate a square wave with a flat top having some high voltage value. In other words, tube 20 acts as a type of switch and produces a signal which has a constant maximum and constant minimum value, the transition or switching point being the predetermined cut-over point mentioned above. In this way, all density values of the subject copy lying on one side of the predetermined value will be reproduced as a maximum signal and all those lying on the other side will be reproduced as a minimum signal. In order to restore the sine wave characteristics of the subcarrier signal, a suitable filter may be interposed between the transmitter 18, and the tube 20, such as capacitor 32, bleeder resistor 33 and, over lead 34, subcarrier frequency filter 16. The constant excursion signals thus generated, after reaching transmitter 18, are radiated over antenna 19 and appear at a receiver as signals representing only two tones, that is, black and white. Since only two tone values are involved no critical adjustment of the receiver and recorder are required to obtain good reproduction.

Figure 2:
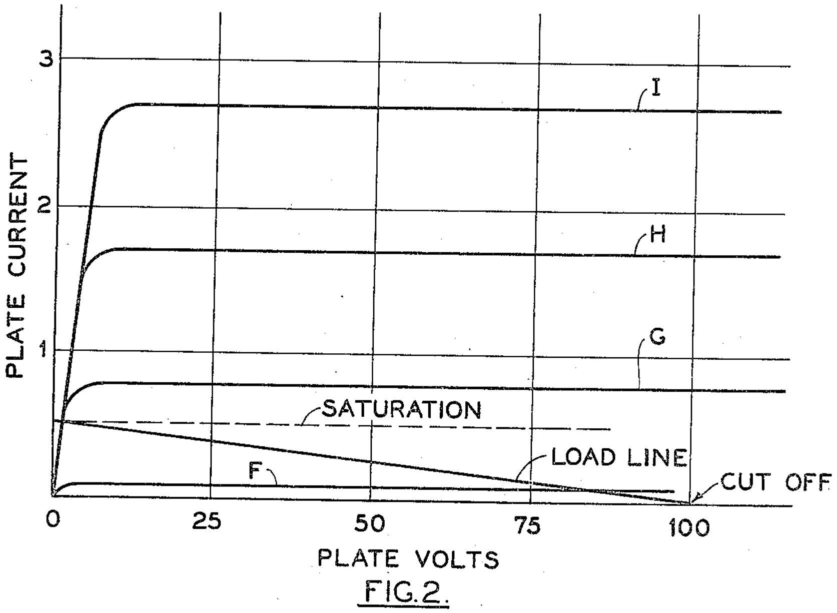
Fig. 2 shows curves illustrating the threshold operation of the present invention.

Fig. 2 shows typical tube characteristic curves in which the plate current is plotted against the plate voltage of a pentode tube suitable for operation according to the present invention. Curves F, G, H, and I are plate current vs. plate voltage for various fixed or zero values of grid voltage. These curves are typical of pentode tubes of the 6SJ7 type when a 100 volt screen potential is being used. The load line shown is determined by the use of a 250,000 ohm resistor and a 100 volt plate potential in addition to the constants given above. It can be seen that the plate current changes from the value marked saturation, where the load line intercepts the plate current curve, to cut-off in a relatively small change of grid bias voltage. Having a load resistor of the size described in the plate circuit, and using the potential values given, grid to cathode potentials of I, H and G produce no change in the voltage across the load resistor. The point of saturation and of a constant low plate voltage is reached between grid to cathode potential values F and G. On the other hand, grid to cathode potentials in the vicinity of F, or below F, produce substantially full supply voltage on the plate. Therefore, there is produced a peak and threshold effect controlled by signal fluctuations. The bias on the grid of the tube determines the position on the signal scale where threshold or peak limiting will take effect. If the tube is originally biased at a rather large positive bias, and the signal is superimposed upon the bias, as the signal swings in a negative direction and reaches the critical region, the plate current will suddently change from saturation to zero at the cut-off point. Similarly, if the signal moves in the opposite direction, the current will maintain the tube at plate saturation.

The result is that, for any range of input signals applied to the grid, a position in the range of signals can be selected wherein all of the signals above that point will cause the tube to operate at maximum output and all of the signals below that point will cause the tube to operate at minimum output.

Figure 3:
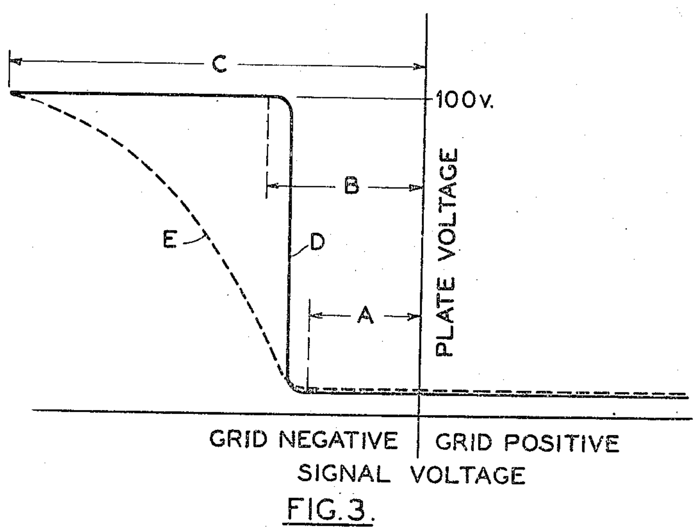
Fig. 3 shows a vacuum tube characteristic suitable for use in the present invention.

Fig. 3 shows this sudden change even more clearly, where the solid curve D represents plate voltage vs. grid or signal voltage. At the positive bias point, the plate voltage is low due to the saturation plate current flowing through the load resistor and, as the signal voltage drives the grid voltage negative, it reaches a point A where the plate voltage suddenly changes from a low value to the full plate supply voltage of 100 volts. This change from a low plate voltage to a high plate voltage takes place between the value A and the value B of grid voltage. Thus, according to the present invention, signal voltages which do not reach A in the negative excursion are not transmitted but are suppressed in the output, while all signal voltages having peak values exceeding B in the negative excursion are transmitted at full value pulses. It will be apparent that, by mutually adjusting the positive grid bias and the signal level, any desired point may be selected as the change over point from zero signal to full signal which, in terms of copy density, will cause the transmission of all density below a certain level to be white and all those above this level to be black.

While this particular description has been given in terms of the operation of a pentode tube other tubes and circuits may be utilized, as for instance, a triode, the characteristics of which are shown as curve E of Fig. 3. The triode crossover takes place between A and C, and, while it is not as sharp as the pentode characteristics, it is useful in certain applications.

While only one form and one modification of the present invention has been shown and described many modifications will be apparent to those skilled in the art within the spirit and scope of the invention as set forth in the appended claims.

What is claimed is:

1. In a facsimile transmitter, the combination of a source of a subcarrier-frequency wave amplitude modulated according to graphic density of copy scanned, a thermionic vacuum tube having at least a cathode, a control grid, a screen grid and a plate, means for positively biasing the control grid, a source of positive voltage connected to the screen grid, a load impedance connected between the plate and the source of positive voltage, whereby either saturation current or no current flows through the tube depending on whether a voltage applied to the control grid is above or below a predetermined narrow range of values, means for applying the amplitude-modulated subcarrier-frequency wave to the control grid of the tube, whereby only waves having more than a predetermined amplitude change the tube current from saturation to no current during those portions of negative cycles which are more negative than said predetermined narrow range of values and means connected to the plate of the tube for translating the subcarrier-frequency voltage fluctuations which appear on the plate into a substantially sine wave alternating-current signal at subcarrier frequency.

2. In a facsimile system, the combination of a source of a subcarrier-frequency wave amplitude modulated according to graphic density of copy scanned, a thermionic vacuum tube having at least a cathode, a control grid, a second grid and a plate, means for positively biasing the control grid, a source of positive voltage connected to the second grid, a load impedance connected between the plate and a source of positive voltage, whereby either saturation current or no current flows through the tube depending on whether a voltage applied to the control grid is above or below a predetermined narrow range of values, and means for applying the amplitude-modulated subcarrier-frequency wave to the control grid of the tube, whereby only waves having more than a predetermined amplitude change the tube current from saturation to no current during those portions of negative cycles which are more negative than said predetermined narrow range of values.

FRANK A. HESTER.

REFERENCES CITED

The following references are of record in the file of this patent:

UNITED STATES PATENTS

| Number | Name | Date |
|---|---|---|
| 1,792,312 | Labus | Feb. 10, 1931 |
| 2,055,513 | Whitaker | Sept. 29, 1936 |
| 2,103,793 | Philpatt | Dec. 28, 1937 |
| 2,202,629 | Hansell | May 28, 1940 |
| 2,274,684 | Ives | Mar. 3, 1942 |
| 2,376,034 | Collings, Jr. | May 15, 1945 |